C. V. TURNER.
EQUIPMENT FOR AUTOMOBILES.
APPLICATION FILED APR. 18, 1912.
1,069,590.
Patented Aug. 5, 1913.
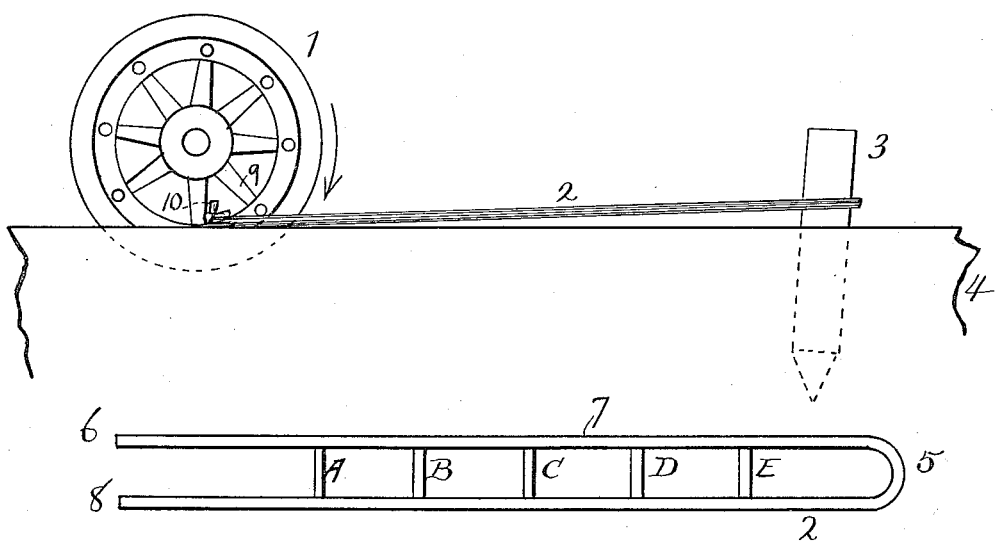
WITNESSES:
Franck Merschrod
E. Huening
INVENTOR,
C. V. Turner,
BY
Edward P. Thompson
ATTORNEY

UNITED STATES PATENT OFFICE.

CLAUDE VERNON TURNER, OF CHICORA, FLORIDA.

EQUIPMENT FOR AUTOMOBILES.

1,069,590.  Specification of Letters Patent.  Patented Aug. 5, 1913.

Application filed April 18, 1912. Serial No. 691,561.

*To all whom it may concern:*

Be it known that I, CLAUDE V. TURNER, a citizen of the United States of America, and resident of Chicora, in the county of Polk and State of Florida, have invented certain new and useful Improvements in Equipments for Automobiles, of which the following is a specification.

My device relates to an automobile equipment for using the power of the motor of the vehicle to pull the latter out of holes, ruts, over obstacles and other places where the wheels cannot obtain sufficient grip upon the road bed to prevent their slipping.

The object of the invention is to provide a device that is easily carried in the automobile or similar engine driven vehicle, and that is readily applied by either an expert chauffeur or by a layman.

The invention is illustrated in the accompanying drawing.

Figure 1 is a side elevation of one of the wheels of an automobile, together with a similar view of the device in use for pulling the vehicle over an obstruction. Fig. 2 is a plan of the principal part of the equipment.

The device illustrated in the drawing consists of a chain composed of the two side pieces 2 and 7, practically parallel to each other and held so by cross pieces A, B, C, D, E, and F. This chain may be made of metal or other material. For the sake of something definite I will speak of it as rope, which is flexible and therefore easily folded up into a small place on the vehicle when not in use. To apply it, the loop end 5 is placed over a stake 3 driven into the ground at a distance, say behind the automobile, or ahead of it if more convenient. The free ends 6 and 8 of the chain are fastened together, conveniently by a knot between those two spokes that are the lowest so that the pull of the spoke when rotating will be to stretch the rope chain. The tire itself is at the left of the first cross piece A.

In order to cause the device to operate properly, the motor of the vehicle is started running. It is now evident that the wheel, being turned in the direction of the arrow, will wind the chain upon the tire, and travel bodily with the vehicle to the right and out of the hole.

I claim as my invention:

A device of the class described, comprising a rope having a loop end for placing over a stake driven into the ground, cross pieces holding different portions of said rope practically parallel to each other, the free ends of the rope being for fastening to each other between the spokes of the wheel of a motor driven vehicle, and the cross pieces being for engaging with the tire of the wheel as the latter rotates.

CLAUDE VERNON TURNER.

Witnesses:
LEONARD MARSH,
J. C. WALDEN.

Copies of this patent may be obtained for five cents each, by addressing the "Commissioner of Patents, Washington, D. C."